United States Patent Office 2,817,644
Patented Dec. 24, 1957

2,817,644
PROCESS FOR CURING POLYEPOXIDES AND RESULTING PRODUCTS

Edward C. Shokal, Walnut Creek, and Herbert A. Newey, Lafayette, Calif., assignors to Shell Development Company, New York, N. Y., a corporation of Delaware No Drawing. Application December 30, 1955
Serial No. 556,441

16 Claims. (Cl. 260—47)

This invention relates to a process for curing polyepoxides. More particularly, the invention relates to a new process for curing polyepoxides using a special class of polyamines, and to the resulting cured products.

Specifically, the invention provides a new process for curing and resinifying polyepoxides, and preferably the glycidyl polyethers and polyesters, which comprises mixing and reacting the polyepoxide with a hydrogenated aromatic primary and/or secondary polyamine possessing at least two amino hydrogen. The invention further provides improved cured products obtained by the above-described process.

It is known that polyepoxides, such as the glycidyl polyethers of polyhydric phenols, may be cured with certain amines, such as diethylene triamine and ethylene diamine. The use of these materials, however, has not been entirely satisfactory for certain commercial applications. These amines have for example, rather obnoxious odors and sometimes cause irritation of the skin of the operator. In addition, these known amine curing agents fail to give products which have the hardness and strength at elevated temperatures required for many applications. Further, the resistance of the cured products to water and solvents leaves much to be desired.

It is an object of the invention, therefore to provide a new process for curing polyepoxides. It is a further object to provide a method for curing polyepoxides, such as the glycidyl polyethers of polyhydric phenols, with a new class of amine curing agents. It is a further object to provide a new process for curing polyepoxides with curing agents which are liquid, have little odor and a low order of toxicity. It is a further object to provide a process for curing polyepoxides which give products having excellent hot hardness. It is a further object to provide a process for curing polyepoxides which gives products having excellent resistance to solvents and water. It is a further object to provide a process for curing polyepoxides which forms an intermediate B stage resin. Other objects and advantages of the invention will be apparent from the following detailed description thereof.

It has now been discovered that these and other objects may be accomplished by the novel process of the invention which comprises mixing and reacting the polyepoxide with a hydrogenated aromatic primary and/or secondary polyamine having at least two amino hydrogen. These special amines have been found to be particularly suitable for use as curing agents as they are liquids and easily dispersed in the polyepoxides and have little odor or toxicity. In addition, they cure the polyepoxides to form products having unexpectedly high hot hardness, excellent resistance to solvents and water and good adhesion to metal and other surfaces.

Surprisingly, it has also been found that these particular polyamines form during the cure of an intermediate soluble and fusible product which is quite stable and can be stored for a long period before being converted to the insoluble infusible state. This intermediate product is particularly useful in commercial applications such as laminating and molding as will be evident from the description given hereinafter.

The aromatic polyamines used in the preparation of the new curing agents are those having one or more aromatic nuclei to which are attached a plurality of primary or secondary amino nitrogen atoms. The amino group should possess at least 2 amino hydrogen and need not be but preferably are attached to the same aromatic nucleus. Examples of the aromatic polyamines include, among others, ortho, meta and para-phenylene diamine, N-methyl para-phenylene diamine, diaminodiphenylmethane, p,p'-methylene dianiline, N-ethyl p,p'-methylene dianiline, p,p'-diamino diphenyl sulfone, triaminobenzene, 2,4-diaminotoluene, 3,3'-diamino diphenyl, 1,3-diamino-4-isopropylbenzene, 1,3 - diamino-4,5 - diethylbenzene, N,N'-diethyltriaminobenzene, diaminostilbene, N,N'-diphenylethylenediamine, 4,4′,4″-triaminotriphenylmethane, 2,6-diaminoanthraquinone, 1-hydroxy-2,4,6-triaminobenzene, and the like. The aromatic polyamines preferably contain no other group reactive with the epoxy group than the amino groups.

Particularly preferred aromatic polyamines include those of the formulae $$X(NHR)_n \text{ and } {}_m(RHN)XR_1X(NHR)_m$$

wherein X is a polyvalent aromatic hydrocarbon radical or hydroxy-substituted aromatic hydrocarbon radical, preferably containing from 6 to 12 carbon atoms, R is an aliphatic hydrocarbon radical, preferably containing 1 to 6 carbon atoms, $R_1$ is a bivalent hydrocarbon radical or —S—, —SO— or —$SO_2$— containing hydrocarbon radical, $n$ is an integer of at least 2, and preferably 2 to 4, and $m$ is an integer of at least 1, and preferably 1 to 3.

Meta-phenylene diamine is especially preferred as the aromatic polyamine, particularly because of the exceptionally superior activity of the resulting hydrogenated product.

Mixtures of the above aromatic polyamines or mixtures of these amines with other nitrogen-containing compounds may also be used, and in some cases it is desirable to use such mixtures. Examples of such mixtures include, among others, mixtures of meta-phenylene diamine and ortho-phenylene diamine, mixtures of meta-phenylene diamine and meta-dinitrobenzene, mixtures of meta-phenylene diamine and aminophenol and mixtures of meta-phenylene diamine and p,p'-diaminodiphenylmethane. Eutectic mixtures are particularly preferred.

The hydrogenation of the above-described aromatic polyamines is accomplished by treating the amines with hydrogen in the presence of a suitable catalyst. The hydrogenation is conducted so as to convert at least 50% of the aromatic structures to aliphatic structures, and more preferably all of the aromatic rings to aliphatic rings The hydrogenation may be accomplished in the presence or absence of diluents or solvents, but for best results it is usually desirable to employ inert diluents, such as ethanol, isopropanol ethylene glycol dimethyl ether, dioxane, and the like, and mixtures thereof.

Preferred catalysts to be used are the metals of group VIII of the periodic table and particularly the metals of the platinum group, such as platinum, palladium, rhodium, ruthenium, osmium, and the like, and their oxides and alloys. These catalysts may be employed in a finely divided form and dispersed in and throughout the reaction mixtures, or they may be employed in a more massive state, either in essentially the pure state or supported upon or carried by an inert carrier material, such as pumic, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range. In general, the amount of catalyst (metal) will vary from .1% to 30% by weight of the reactants. Preferred amounts of catalyst range from 1% to 25% by weight. The above-described preferred catalysts (metal) are generally employed in amounts varying from 1% to 10% by weight.

Temperatures used during the hydrogenation will vary from about 30° C. to about 300° C. depending on the catalyst selected. With most active catalysts, such as rhodium, the hydrogenation may be accomplished at or near room temperature; with less active catalysts, preferred temperatures range from 100° C. to 250° C. Hydrogen pressure of about 50 pounds per square inch are effective, and higher pressures of the order of about 500 to 2000 p. s. i. can be used. Particularly preferred hydrogen pressures range from about 10 p. s. i. to 2000 p. s. i.

At the conclusion of the hydrogenation, the amines may be recovered directly from the reaction mixture by any suitable manner. For example, the hydrogenation catalyst, if dispersed in the reaction mixture, may be removed by filtration or centrifugation and the amines recovered by distillation, solvent extraction, crystallization or other known methods.

The curing of the polyepoxides with the above-described hydrogenated materials may be accomplished by mixing the two components together. The reaction occurs slowly at temperatures as low as about 20° C. and for best results it is best to heat the mixture between about 50° C. and about 280° C. Particularly preferred temperatures range from about 80° C. to about 200° C. With small castings it is preferred to cure for about 2 hours at about 80–100 C., and then post cure for an additional 2 hours or so at about 140 to about 225° C.

As indicated above, use of the above-described hydrogenated materials as curing agents permits resinification of the polyepoxide in several stages. When the hydrogenated materials react with the polyepoxides, there is first formed a resinous product which is fusible and soluble in acetone. Continued curing then gives the final resinous product which is characterized by being hard and infusible. At elevated curing temperatures, the different stages of cure flow from one to the other without interruption. However, it is often useful to arrest the curing reactions before infusibilization occurs. This is accomplished by cooling below a temperature of about 40° C. Although the fusible resinous product does not appear to have indefinite life in the state of fusibility at such low temperature, it does remain readily fusible for a number of weeks when kept at about 20° C. to 25° C., and it also remains soluble in acetone during this period. This unique property of the fusible resinous product along with its normally solid, non-tacky character makes it very useful.

The amount of the hydrogenated aromatic polyamine to be employed in the cure of the polyepoxide may vary over a considerable range. Amounts of the hydrogenated material can range from about 5 parts per 100 parts of polyepoxide up to about 50 parts per 100 parts of polyepoxide. Best results are obtained, however, when the curing agent is employed in amounts varying from 10 to 30 parts per 100 parts of polyepoxide.

In curing polyepoxides, it is usually desirable to have the polyepoxide in a mobile condition when the adduct is added in order to facilitate mixing. The polyepoxides, such as the glycidyl polyether of polyhydric phenols, are generally very viscous to solid materials at ordinary temperatures. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the hydrogenated aromatic polyamines by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured composition may also be used, such as diethyl phthalate, dibutyl phthalate or liquid monoepoxides, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide. Various other ingredients may be mixed with the polyepoxide compositions including pigments, fillers, dyes, plasticizers, resins, and the like.

The above-described hydrogenated aromatic polyamines may be used as curing agents alone or may be used in admixture with other curing agents, such as other aliphatic polyamines or aromatic polyamines.

The curing agent-polyepoxide systems described above may be utilized for a great variety of important applications. Because of their rapid cure at the low temperatures, they are particularly useful in the preparation of rapid cure coating compositions, such as enamels and the like. In this application, it is generally desirable to combine the polyepoxide with the curing agent and desired solvents or other film-forming materials, and then apply this mixture to the surface to be coated. The coatings may be allowed to set at room temperature or heat may be applied.

The systems described above are also very useful in the preparation of electrical pottings and castings. They are particularly suitable for preparing very large castings as can be cured at low temperatures without liberation of large amounts of heat and this gives a more even cure which results in much stronger and more durable products. In this application, the mixture of polyepoxide, amine alone or with suitable diluents is added to the desired mold or casting and then allowed to set at room temperature. Heat may be applied in some cases to hasten cure.

The above-described systems are also useful in the preparation of laminates. In this application, the sheets of fibrous material are first impregnated with the mixture of polyepoxide and amine. This is conveniently accomplished by dissolving the amine in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C., to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestor paper, mica flakes, cotton bats, duck muslin, canvas and the like. It is usually preferred to utilize woven glass cloth that has been given prior treatment with well known finishing or sizing agents therefor, such as chrome methacrylate or vinyl trichlorosilane.

In the above applications, the resulting cured products are characterized by their hardness, high hot values, high heat distortion values and their excellent resistance to solvents and water.

The polyepoxides to be cured by use of the above process are those possessing at least two

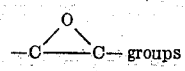 groups

These groups may be terminal, i. e.,

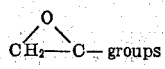 groups or they may be in an internal position. Preferably the epoxy groups are terminal. The polyepoxides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such a 1.5, 1.8, 2.5, and the like.

Various examples of polyepoxides that may be used in the process of the invention are given in U. S. 2,633,458 and it is to be understood that so much of the disclosure of that patent relative to examples of polyepoxides is incorporated by reference into this specification.

The glycidyl polyethers of polyhydric phenols obtained by condensing the polyhydric phenols with epichlorohydrin as described in U. S. 2,633,458 are also referred to as "ethoxyline" resins. See Chemical Week, vol. 69, page 27, for September 8, 1951.

A group of polyepoxides not specifically illustrated in the above-noted patent comprises the glycidyl ethers of novalac resins which resins are obtained by condensing an aldehyde with a polyhydric phenol. A typical member of this class is the epoxy resin from formaldehyde 2,2-bis-(5-hydroxyphenol)propane novalac resin which contains as predominant constituent the substance represented by the formula:

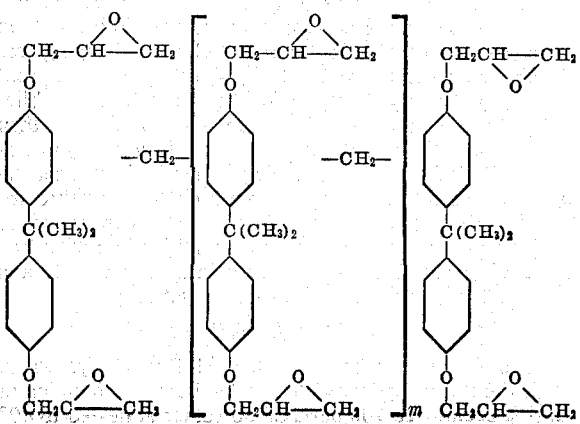

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

To illustrate the manner in which the invention may be carried out, the following examples are given. It is to be understood, however, that the examples are for the purpose of illustration and the invention is not to be regarded as limited to any of the specific materials or conditions recited therein.

The polyethers referred to in the examples, such as, for example, Polyether A, are those described in U. S. 2,633,458.

Example I

This example illustrates the preparation of hydrogenated meta-phenylene diamine and the superior properties of such a product as compared to other known amine curing agents for polyepoxides.

108 parts of meta-phenylene diamine and 300 parts of dioxane were placed in a stainless steel bomb and 2.5 parts of ruthenium dioxide added thereto. Hydrogen was then introduced under pressure and the temperature maintained at 100–120° C. for 8 hours. At that time, approximately the theoretical amount of hydrogen had been absorbed.

The contents of the bomb was then treated with Norite A and filtered. The dioxane was then distilled off at atmospheric pressure. The residue was distilled under vacuum to give a mobile colorless liquid identified as diaminocyclohexane.

15 parts of the diaminocyclohexane produced above was combined with 100 parts of Polyether A and the mixture heated for 4 hours at 100° C. and then 2 hours at 150° C. The resulting product had a Barcol hardness of 40 at room temperature, a Barcol hardness of 19 at 100° C., and a value of 8 at 120° C. After being placed in boiling water for 3 hours, the product had a Barcol hardness of 42.

A casting prepared by heating Polyether A with 15 parts of diethylene triamine had a Barcol hardness of 4 at 100° C. and a value of 0 at 120° C.

Another casting prepared by heating Polyether A with 10 parts of triethylene tetraamine had a Barcol hardness of 11 at 80° C. and 0 at 120° C.

A comparison of the above results demonstrates that the resin prepared from the hydrogenated meta-phenylene diamine is unique in having hot hardness at temperatures as high as 120° C.

Example II

This example illustrates another preparation of hydrogenated meta-phenylene diamine and its use as a curing agent for Polyether A.

.72 mole of meta-phenylene diamine was dissolved in 300 parts of ethanol and the mixture placed in a Parr hydrogenator. 20 parts of 5% rhodium on $Al_2O_3$ was added thereto. Hydrogen under 50 p. s. i. pressure was introduced at room temperature. Hydrogen was rapidly absorbed and the reaction was stopped after 2.15 moles of hydrogen had been taken up. The catalyst was then removed by filtration and the filtrate distilled under reduced pressure to remove ethanol. Further distillation gave a mobile highly refractive liquid which had a boiling point of 125° C. at 3-4 mm.

8 parts of the hydrogenated meta-phenylene diamine produced above was combined with 92 parts of Polyether A. The mixture blended readily without an exotherm. The mixture was then heated at 80° C. for 4 hours and post cured at 150° C. The resulting casting had a Barcol hardness of 30-35.

When the above experiment was repeated using 12 parts of the hydrogenated product, the Barcol hardness was 40.

*Example III*

This example illustrates the preparation of hydrogenated p,p'-diamino diphenyl methane and its use as a curing agent for Polyether A.

125 parts of p,p'-diamino diphenyl methane and 312 parts of pure dioxane were placed in a stainless steel bomb and 2.5 parts of ruthenium dioxide added thereto. Hydrogen was then introduced under pressure of 2550 to 3735 p. s. i. and the temperature maintained at 100–120° C. for 8 hours. At that time approximately theoretical amount of hydrogen had been absorbed.

The contents of the bomb was then treated with Norite A and filtered. The dioxane was then distilled off at atmospheric pressure. The residue was then distilled under vacuum to give a mobile colorless liquid having a boiling point of 121–24° C. at 1 mm. Analysis indicated the product had the formula

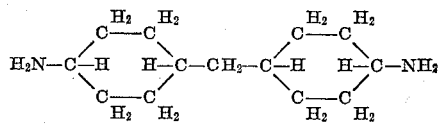

28 parts of the hydrogenated p,p'-diamino diphenyl methane prepared above was combined with 100 parts of Polyether A and the mixture heated at 100° C. for 4 hours. The resulting casting had a Barcol hardness of 30 at room temperature. After being in boiling water for 3 hours, the product had a Barcol hardness of 32 and after being in boiling acetone for 3 hours had a Barcol hardness of 35. At 100° C., the casting had a Barcol hardness of 16.

10 parts of the hydrogenated p,p'-diamino diphenyl methane was added to a solvent solution of Polyether D and the mixture spread on steel panels. After curing for 30 minutes at 150° C., the coating was very hard and unaffected by toluene, acetone and methyl isobutyl ketone. The coating was also unaffected after 15 minutes in boiling water.

*Example IV*

This example illustrates the preparation of hydrogenated p-phenylene diamine and its use as a curing agent for Polyether A.

300 parts of p-phenylene diamine was dissolved in 400 parts of ethanol and the mixture placed in a Parr hydrogenator. 50 parts of 5% rhodium on $Al_2O_3$ was added thereto. Hydrogen under 50 p. s. i. pressure was introduced at room temperature. Hydrogen was rapidly absorbed and the reaction was stopped after 8.57 moles of hydrogen had been taken up. The catalyst was then removed by filtration and the filtrate distilled under reduced pressure to remove ethanol. Further distillation gave a mobile highly refractive liquid.

10 parts of the hydrogenated p-phenylamine diamine produced above was combined with 100 parts of Polyether A. The mixture blended readily without an exotherm. The mixture was then heated at 80° C. for 4 hours and post cured at 150° C. The resulting casting was very hard and still retained hardness at temperatures as high as 120° C.

Related results are obtained by replacing the Polyether A in the above-described curing process with equivalent amounts of each of the following: Polyether B, Polyether C and Polyether D.

*Example V*

This example illustrates the preparation of hydrogenated benzene triamine and its use as a curing agent for Polyether A.

2 moles of benzene triamine are dissolved in ethanol and the mixture placed in a Parr hydrogenator. 15 parts of 5% rhodium on $Al_2O_3$ are added thereto. Hydrogen under 50 p. s. i. pressure is then introduced at room temperature. Hydrogen is rapidly absorbed and the reaction stopped when about 6 moles of hydrogen had been taken up. The catalyst is then removed by filtration and the filtrate distilled under reduced pressure to remove ethanol. Further distillation gives a mobile colorless liquid.

10 parts of the hydrogenated benzene triamine produced is combined with 100 parts of Polyether A. The mixture blended readily without an exotherm. The mixture was then heated at 80° C. for 4 hours and post cured at 150° C. The resulting casting is very hard and retains hardness even at temperatures as high as 120° C. The casting also shows excellent resistance to boiling water and boiling acetone.

*Example VI*

This example illustrates the preparation of hydrogenated p,p'-diamino diphenyl sulfone and its use as a curing agent for Polyether A.

1.5 moles of p,p'-diamino diphenyl sulfone are dissolved in ethanol and the mixture placed in a Parr hydrogenator. 10 parts of 5% rhodium on $Al_2O_3$ are added thereto. Hydrogen under 50 p. s. i. pressure is then introduced at room temperature. After the mixture has absorbed 4.3 moles of hydrogen, the reaction is stopped. The catalyst is then removed by filtration and the filtrate distilled under reduced pressure to remove ethanol. Further distillation gives a mobile colorless liquid.

8 parts of the hydrogenated p,p'-diamino diphenyl sulfone produced above is combined with 92 parts of Polyether A. The mixture blended readily without an exotherm. The mixture is then heated at 80° C. for 4 hours and cured at 150° C. The resulting casting has a Barcol hardness of 30–35 at room temperature and still retains hardness at 120° C.

*Example VII*

This example illustrates the preparation of a fiberglass laminate using Polyether A and hydrogenated meta-phenylene diamine.

A varnish was prepared by adding 16 parts of hydrogenated meta-phenylene diamine in acetone and stirring this solution into Polyether A to give a 60% solids solution. Sheets of fiberglass cloth 181—Volan A are impregnated by painting the solution on the cloth and then drying for 30 to 50 minutes at 90° C. while hanging free in an air oven to form non-tacky sheets. This treatment resinified the polyether to a fusible product. Assemblies of 12 plies of superimposed impregnated cloth were then prepared. The assemblies were cured in a press operating at 107° C. A curing cycle was used wherein the assembly was first subjected to mere contact pressure for a minute or so and then the pressure was increased to 200 pounds per square inch. The resulting laminates had excellent flexural strength and modulus of elasticity and excellent resistance to solvents and water.

*Example VIII*

A molding powder was prepared from Polyether A with the use of hydrogenated meta-phenylene diamine as curing agent. To 100 parts of Polyether A heated to 40°

C., 12.5 parts of hydrogenated meta-phenylene diamine is mixed in and heated to 65° C. for 1¾ hours. The resulting fusible resin is cooled and ground up to 60 mesh powder. A molding mixture is prepared containing 100 parts of the resin powder, 67 parts of alpha-cellulose flock, 4 parts of titanium dioxide powder and 2 parts of ground calcium stearate. The ingredients are thoroughly mixed and then milled together for 5 minutes with the front roll at 70° C. and the back roll cold. The milled sheet is ground to give the molding powder.

The molding powder formed above had good stability and could be cured by heating at 180° C. and pressure of 6,400 p. s. i. to form castings having excellent hardness at high temperatures and good resistance to solvents.

We claim as our invention:

1. A process for producing a resinified product which comprises mixing and reacting at a temperature between 50° C. and 280° C. a polyepoxide having a

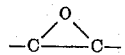

equivalency greater than 1.0 with from about 5 to 50 parts per 100 parts of the polyepoxide of a hydrogenated aromatic polyamine, said aromatic polyamine being selected from the group consisting of primary and secondary aromatic polyamines having at least two amino hydrogens, and at least 50% of the aromatic structure of the said aromatic amines being converted to cycloaliphatic structure during the hydrogenation.

2. A process as in claim 1 wherein the hydrogenated polyamine is hydrogenated meta-phenylene diamine.

3. A process as in claim 1 wherein the hydrogenated aromatic polyamine is hydrogenated p,p'-diamino diphenyl methane.

4. A process for producing a resinified product which comprises mixing and reacting at a temperature between 50° C. and 280° C. a glycidyl polyether having an epoxy equivalency greater than 1.0 selected from the group consisting of glycidyl polyethers of polyhydric phenols and polyhydric alcohols with from about 5 to 50 parts per 100 parts of the glycidyl polyether of a hydrogenated aromatic primary polyamine comprising an aromatic hydrocarbon substituted with from 2 to 4 primary amino groups and containing from 6 to 16 carbon atoms, at least 50% of the aromatic structure of the said aromatic primary polyamine being converted to cycloaliphatic structure during hydrogenation.

5. A process as in claim 4 wherein the polyepoxide is a glycidyl polyether of a polyhydric phenol having a 1,2 epoxy equivalency between 1.0 and 2.0 and a molecular weight between 200 and 900.

6. A process as in claim 4 wherein the polyepoxide is a glycidyl polyether of a polyhydric alcohol having an epoxy equivalency between 1.1 and 3.0 and a molecular weight between 170 and 800.

7. A process as in claim 4 wherein the aromatic polyamine is a phenylene diamine.

8. A process for producing a resinified product which comprises mixing and reacting at a temperature between 50° C. and 280° C. a hydrogenated aromatic hydrocarbon diamine having at least two amino hydrogens wherein at least 50% of the aromatic structure of the said aromatic diamine has been converted to cycloaliphatic structure during the hydrogenation with a glycidyl polyether of a dihydric phenol having a 1,2-epoxy equivalency between 1.0 and 2.0 in amount of about 10 parts to 40 parts of the diamine per 100 parts of the polyether.

9. A process for producing a resinified product which comprises mixing and reacting at a temperature between 50° C. and 280° C. hydrogenated meta-phenylene diamine wherein the aromatic ring has been converted to a cyclohexane ring with a glycidyl polyether of 2,2-bis(4-hydroxyphenyl) propane having a 1-2-epoxy equivalency between 1.0 and 2.0 and a molecular weight between 175 to 6000, in amount varying from about 10 parts to 40 parts of the diamine per 100 parts of the polyether.

10. A process for producing a resinified product which comprises the steps of mixing and reacting hydrogenated meta-phenylene diamine wherein the aromatic ring has been converted to a cyclohexane ring with a glycidyl polyether of a polyhydric phenol having a 1,2-epoxy equivalency greater than 1.0 in amount of about 10 to 40 parts per 100 parts of the polyether, arresting the curing of the mixture before it becomes infusible by cooling to a temperature below about 40° C., and subsequently completing the cure of the fusible product by heating it at about 90° C. to 200° C. until a hard infusible resinous product is obtained.

11. A process as in claim 8 wherein the hydrogenated aromatic polyamine is hydrogenated meta-phenylene diamine wherein the aromatic ring has been converted to a cyclohexane ring.

12. A process as in claim 8 wherein the hydrogenated aromatic polyamine is hydrogenated p,p'-diamino diphenyl methane wherein the two phenyl rings have been converted to cyclohexyl rings.

13. A process as in claim 8 wherein the hydrogenated aromatic polyamine is hydrogenated triaminobenzene wherein the aromatic ring has been converted to a cyclohexane ring.

14. A process for producing a resinified product which comprises mixing and reacting at a temperature between 50° C. and 280° C. a polyepoxide having a

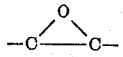

equivalency greater than 1.0 with from about 5 to 50 parts per 100 parts of the polyepoxide of a polyamine possessing a plurality of amino nitrogen atoms which are attached to from 1 to 2 hydrogen atoms and to six-membered cycloaliphatic ring.

15. A process for producing a resinified product which comprises mixing and reacting a glycidyl polyether of a polyhydric phenol having a 1,2-epoxy equivalency between 1.0 and 2.0 and a molecular weight between 200 and 900 with from about 5 to 50 parts per 100 parts of the glycidyl polyether of a polyamine possessing from 2 to 4 primary amino groups which are attached to six-membered cycloaliphatic ring.

16. A process as in claim 15 wherein the polyamine is 1,3-diaminocyclohexane.

References Cited in the file of this patent
UNITED STATES PATENTS 2,709,664  Evans _____ May 31, 1955
2,717,885  Greenlee _____ Sept. 13, 1955